Sept. 19, 1961 G. E. MUSSEY ET AL 3,000,187
REFRIGERATED STORAGE TANK
Filed April 15, 1957 11 Sheets-Sheet 3
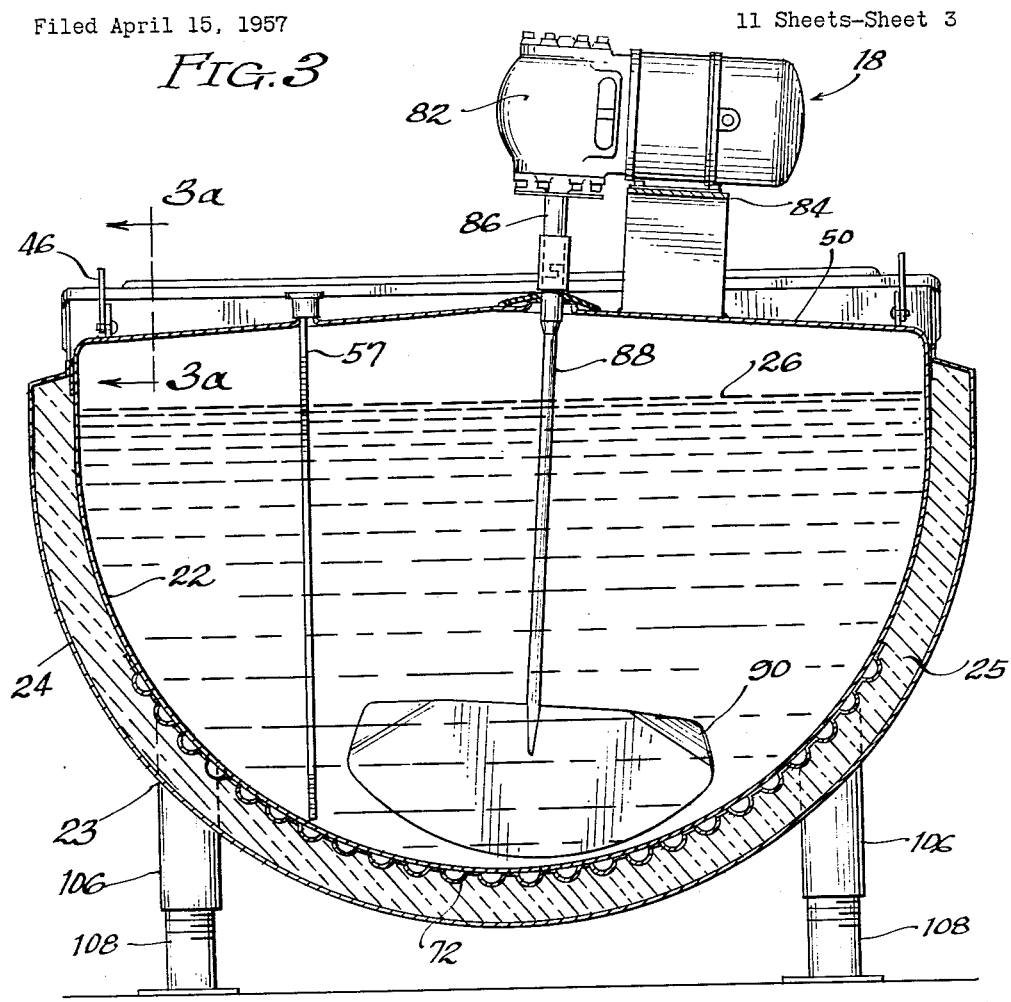
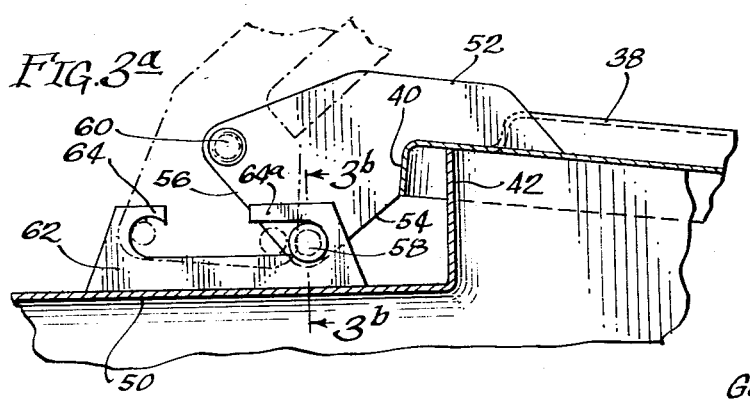
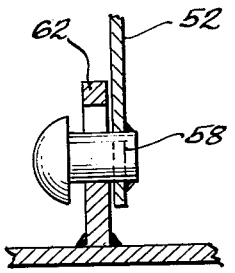
INVENTORS
George E. Mussey
John J. Yucus
BY Paul L. Lucem
Ooms, McDougall, Williams & Hersh
Attorneys INVENTORS
George E. Mussey
John J. Lucus
Paul L. Luxem
BY Ooms, McDougall, Williams & Hersh
Attorneys

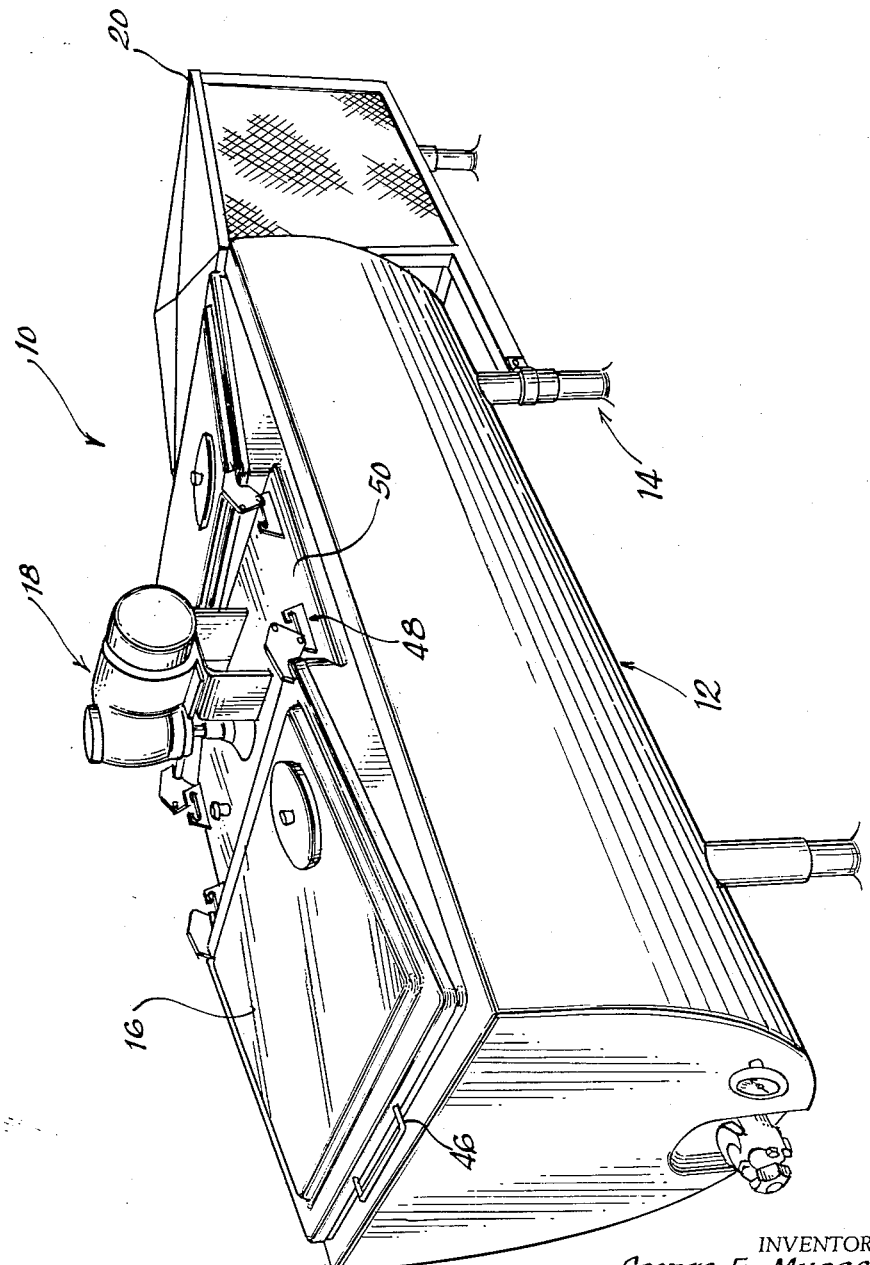

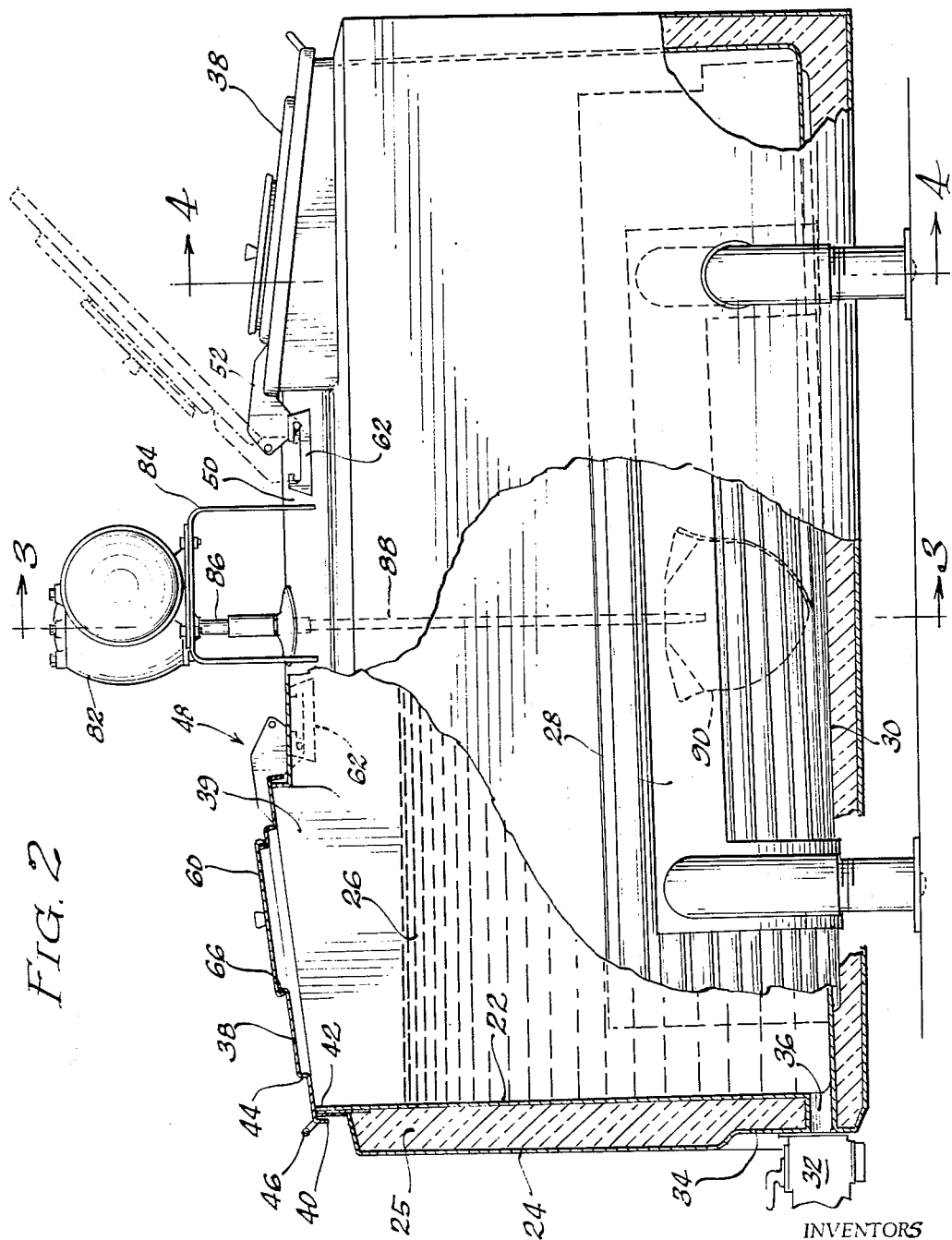

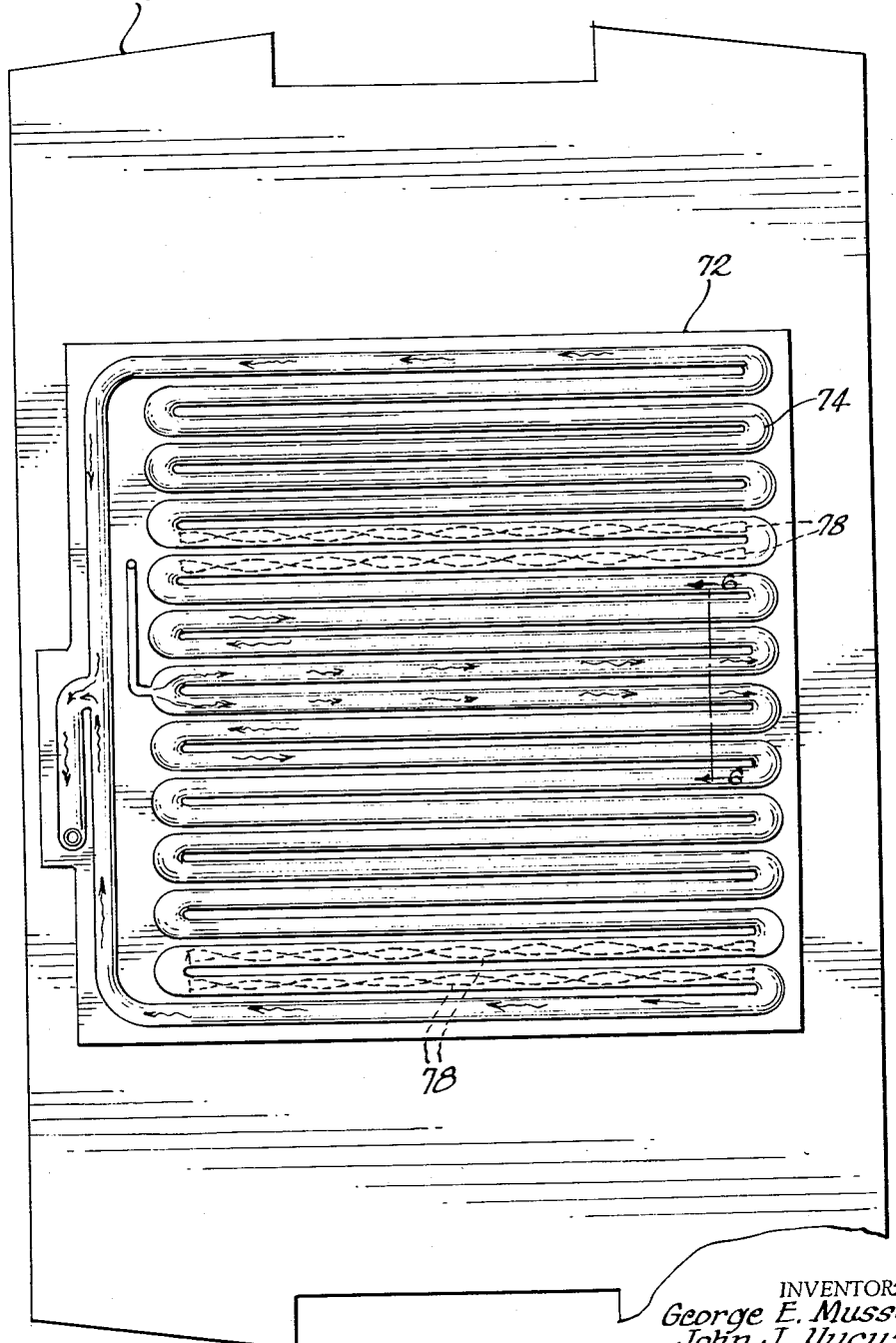

Sept. 19, 1961  G. E. MUSSEY ET AL  3,000,187
REFRIGERATED STORAGE TANK
Filed April 15, 1957  11 Sheets-Sheet 6
FIG. 9
FIG. 10
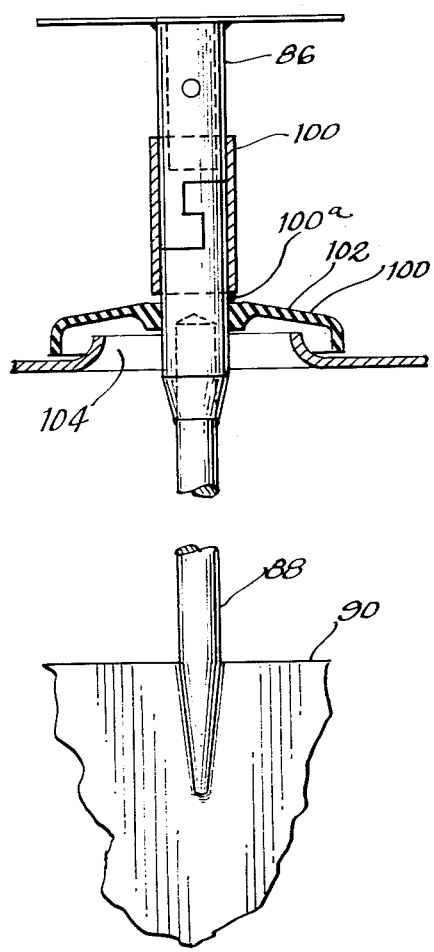
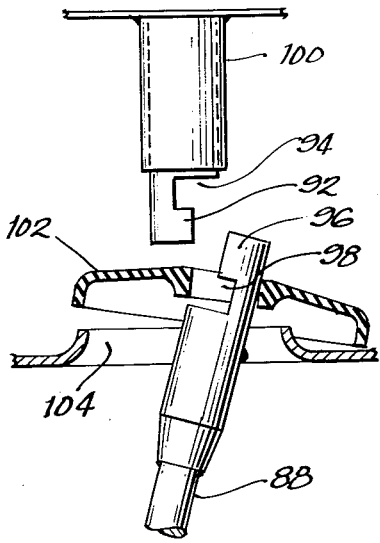
INVENTORS
George E. Mussey
John J. Yucus
BY Paul L. Luxem
Ooms, McDougall, Williams & Hersh
Attorneys

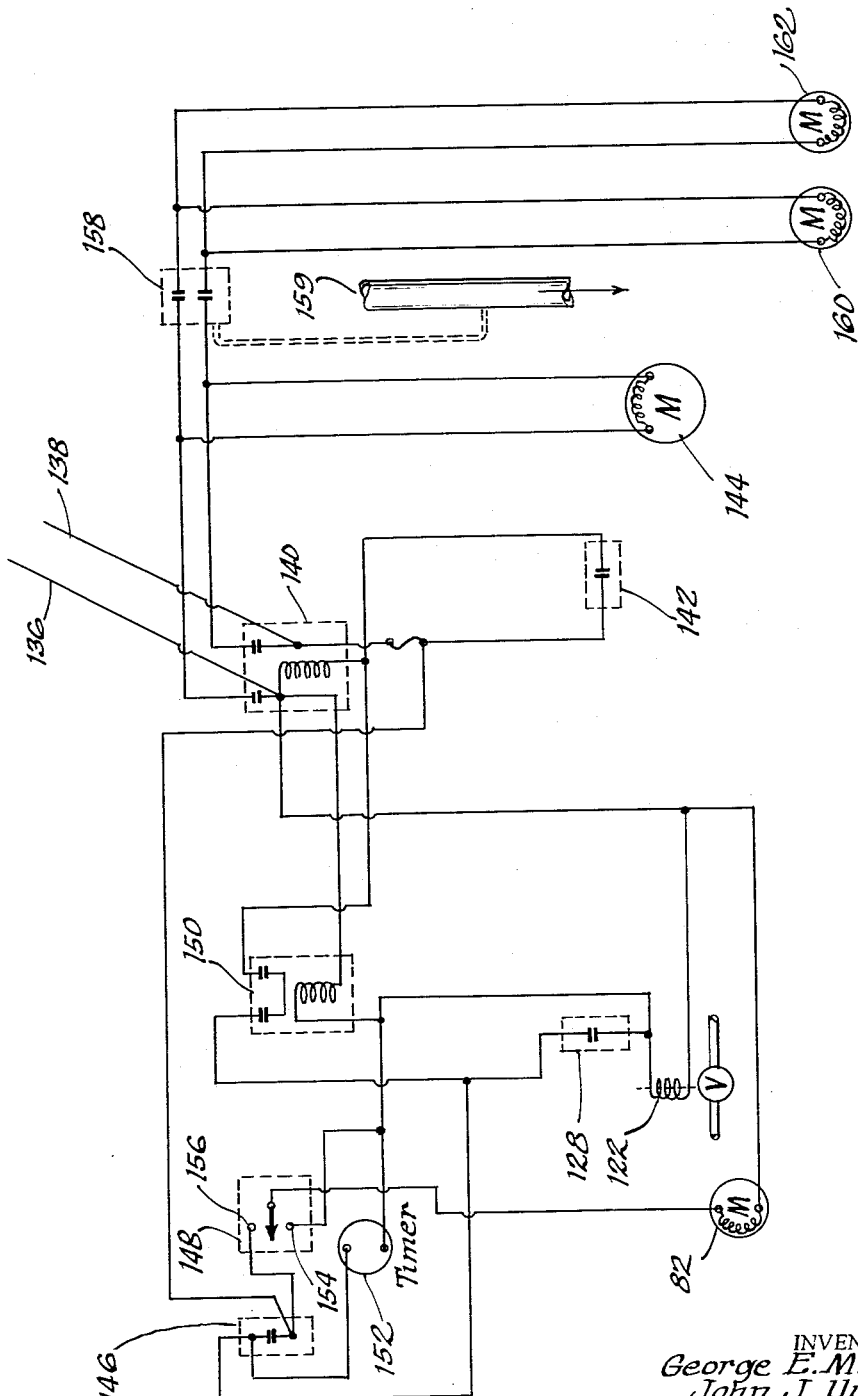

Sept. 19, 1961    G. E. MUSSEY ET AL    3,000,187
REFRIGERATED STORAGE TANK
Filed April 15, 1957    11 Sheets-Sheet 9

INVENTORS
George E. Mussey
John J. Yucus
Paul L. Luxem
BY
Ooms, McDougall,
Williams & Hersh
Attorneys Sept. 19, 1961 G. E. MUSSEY ET AL 3,000,187
REFRIGERATED STORAGE TANK
Filed April 15, 1957 11 Sheets-Sheet 11

INVENTORS
George E. Mussey
John J. Yucus
Paul L. Luxem
BY
Ooms, McDougall, Williams & Hersh
Attorneys United States Patent Office 3,000,187
Patented Sept. 19, 1961

3,000,187
REFRIGERATED STORAGE TANK
George E. Mussey, Paul L. Luxem, and John J. Yucus,
Tomahawk, Wis., assignors to U.S. Industries, Inc.,
New York, N.Y., a corporation of Delaware
Filed Apr. 15, 1957, Ser. No. 652,871
3 Claims. (Cl. 62—158)

This invention relates to a fluid storage container and more particularly to a fluid storage container for use in the collection and storage of a perishable liquid, such as milk, under extreme sanitary and refrigerated conditions to prevent deterioration of the content material.

Problems posed by the design of fluid storage containers for the collection and storage of highly perishable fluids for human consumption, such as milk, are very severe. These problems fall into two categories, one the prevention of the entrance of contaminated or contaminating material into the container, and the other the complete removal of all traces of the fluid during cleaning processes, because failure to remove these traces permits them to deteriorate and contaminate additional fluid later added to the container. To insure the complete removal of all traces of fluid during cleaning, considerable attention must be paid to the design of the container to eliminate corners, crevices, and even slightly rough surfaces to which fluid particles can adhere. Inseparably connected with these problems of design are the problems of fabrication since the limitations imposed by the use to which these containers are put do not always permit recourse to conventional fabricating processes. Therefore, to produce a storage container which satisfies these severe limitations requires the simultaneous and inseparable solutions of the problems of manufacture as well as the appropriate design.

Another problem independent of the design and manufacture of the storage tank is the strict temperature controls required. Liquids such as milk, for example, must be cooled to a temperature between freezing and 50° F. within one hour after the milking since above these temperatures milk deteriorates rapidly. To satisfy these needs, temperature control mechanisms are built into the container refrigerating system. In actual use, after the milk in the container is reduced to the temperature determined on the setting on the temperature control mechanism, an additional quantity of warm milk is frequently added. If, at the time the warm milk is added, the temperature control mechanism has cut off the refrigerating mechanism, considerable time might elapse before the liquid is mixed to affect the temperature since a mechanism can cause the refrigerating system to start up again, or it could happen that the temperature may never rise high enough to start the refrigerating system. This mixture of warm and cold milk is conducive to the growth of bacteria so failure of the refrigerating mechanism to start promptly could lessen the permissible safety margin and could even cause the milk to deteriorate. Therefore the refrigerating mechanisms must take these problems into account and means must be provided immediately to reduce the temperature of the added milk to the desired value, regardless of the temperature of the milk present in the container.

An added problem in the design of these refrigerating systems is that economics and efficient operation require the cooling coils of the refrigerating system to be very close to the milk. Yet this closeness subjects them to severe temperature changes since the storage container is frequently cleaned with hot cleaning solutions, and the resulting high temperatures in the coils could produce damagingly high pressure.

When the liquid storage container is used to store milk another problem arises. Governmental regulations require the containers to be used as liquid measuring devices as well as storage containers. The amount of liquid in these containers is usually determined by means of a dip stick or other analagous device. It is apparent, however, that if the weight of the material in the container causes a distortion in its shape, the reading on the dip stick would be erroneous. Therefore the design of the container must insure, within the limits of economic practicality, that there will be no distortion in the container due to the weight of the liquid being stored. Another factor which could affect the reading on the dip stick is if the container is not leveled properly, so each container must be provided with means to indicate its level position and means must be provided to compensate for floors which are not level.

Therefore, a principal object of this invention is to produce a storage tank for use in the collection and storage of milk or the like under controlled refrigerated conditions.

Another object of this invention is to produce a storage tank for use in the collection and storage of milk which can be easily and readily cleaned without leaving any trace of the milk behind.

A further object of this invention is to produce a storage tank for use in the collection and storage of milk which has no sharp corners or rough surfaces to which traces of the milk can adhere during cleaning.

Still another object of this invention is to devise a method of eliminating sharp corners and rough surfaces during the production of a storage tank.

Yet another object of this invention is to provide a temperature control mechanism for the refrigerating system of a liquid storage tank, which starts the refrigerating mechanism immediately upon the introduction of fresh warm milk, regardless of the temperature of the milk in the container, or the position of the refrigerating cycle.

Another object of this invention is to provide a mechanism for a refrigerating system which can permit the refrigerating coils to withstand severe temperature changes, during cleaning, without the development of damaging high pressures.

Another object of this invention is to provide a liquid storage container which can withstand the weight of the liquid without appreciable deformation.

Another object of this invention is to provide a liquid storage container with easily adjustable leveling means.

A further object of this invention is to construct a milk storage container which is simple to construct, economical to make and having an attractive appearance.

These and other objects of this invention will become more apparent when understood in the light of the accompanying specification and drawings wherein—

FIGURE 1 is a perspective view of the tank;

FIGURE 2 is a side elevation of the tank with parts broken away to show details of the internal structure;

FIGURE 3 is a sectional view taken along line 3—3 of FIGURE 2;

FIGURE 3a is a sectional view taken along the line 3a—3a of FIGURE 3;

FIGURE 3b is a sectional view taken along the line 3b—3b of FIGURE 3a;

FIGURE 5 is a developed view of the outer surface of the inner tank and evaporator plate;

FIGURE 9 is an enlarged side view of the bayonet connection between the agitator motor shaft and the mixer shaft;

FIGURE 10 is an enlarged side view of the bayonet connection between the agitator motor shaft and the mixer shaft disclosing the mode of disassembly;

Figure 26:
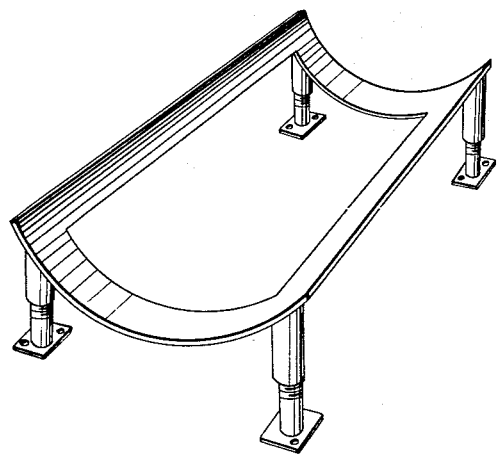
Figure 15:
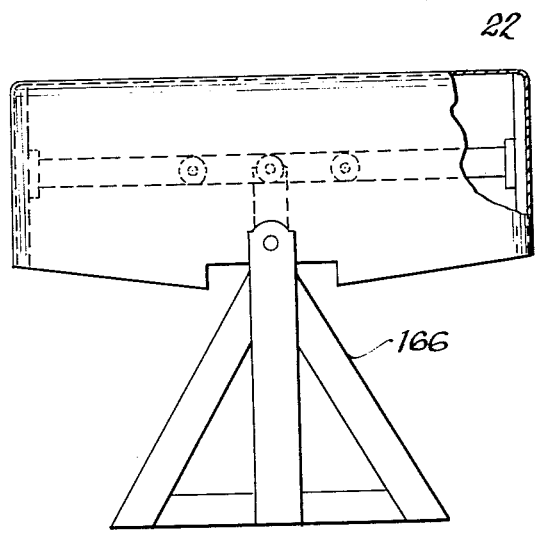
Figure 13:
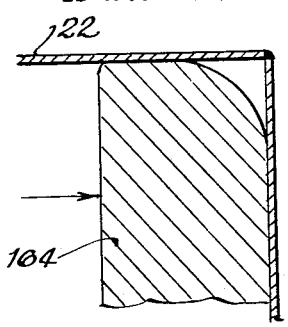
Figure 14:
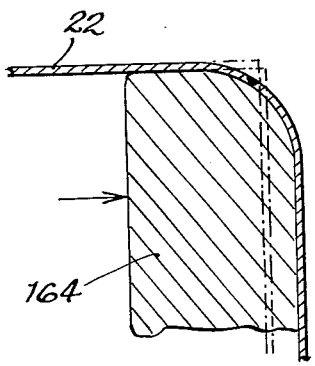
Figure 16:
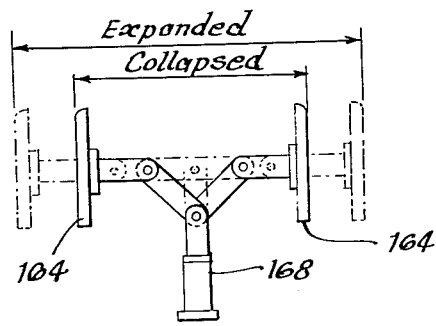
Figure 17:
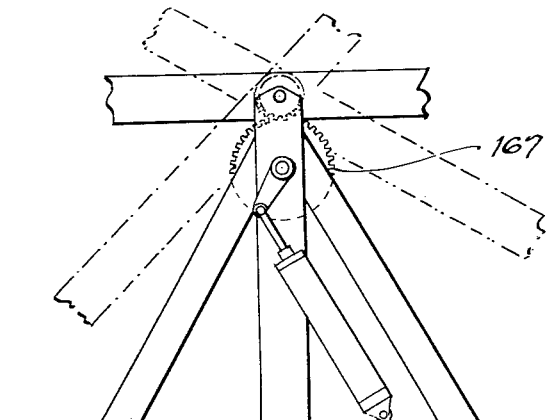
Figure 18:
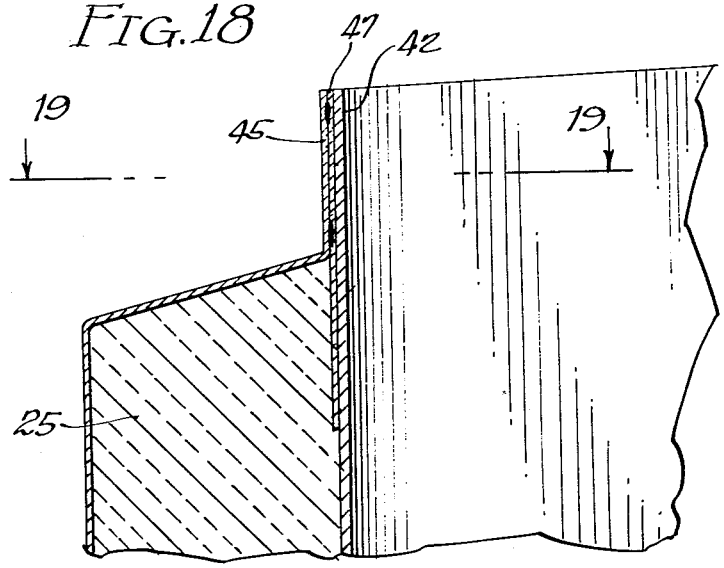
Figure 19:
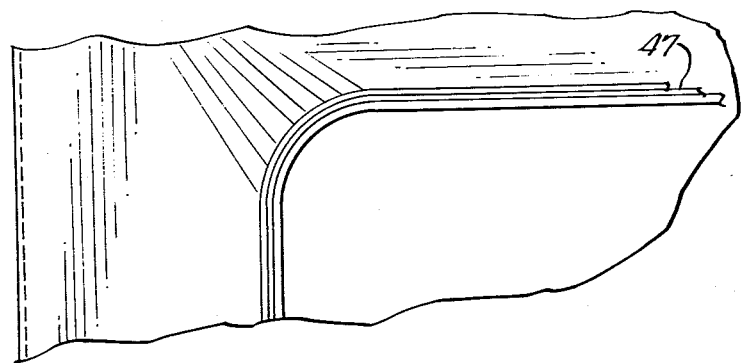
Figure 20:
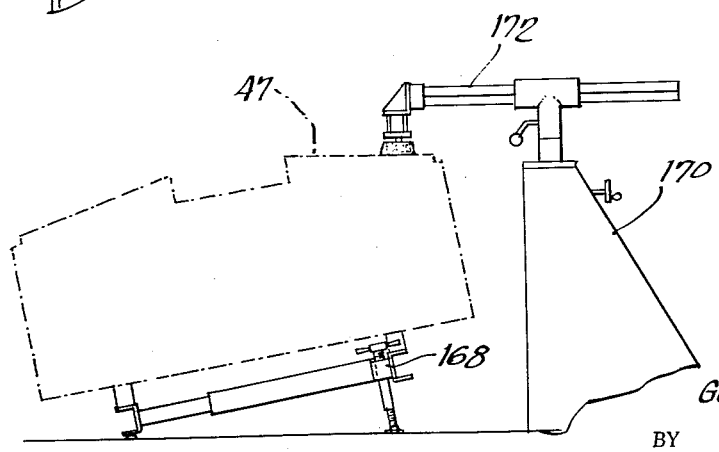
Figure 21:
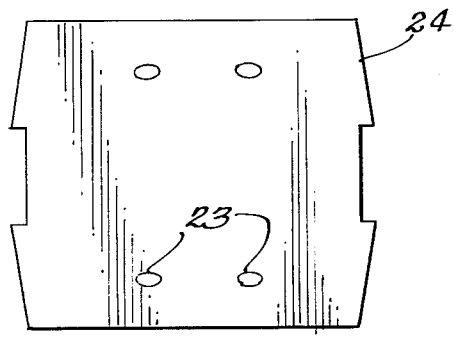
Figure 22:
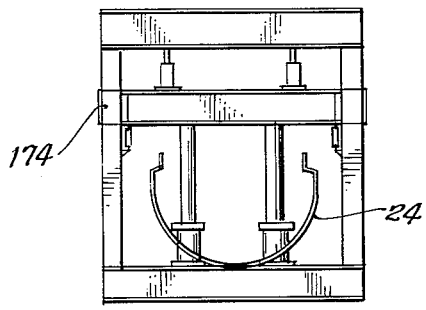
Figure 23:
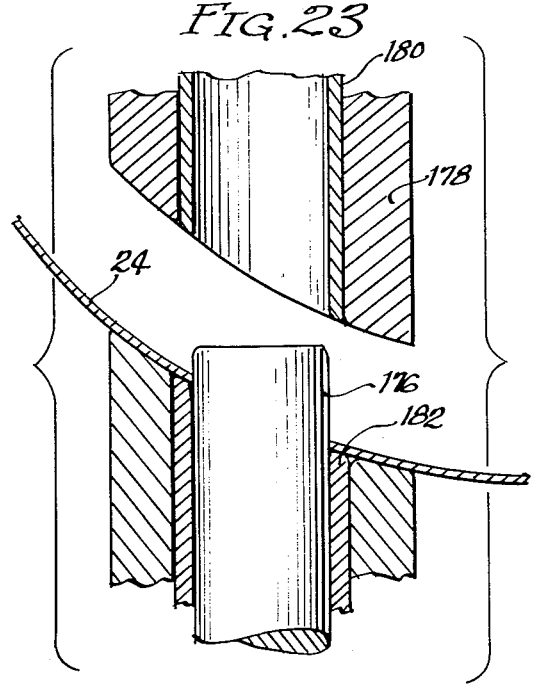
Figure 24:
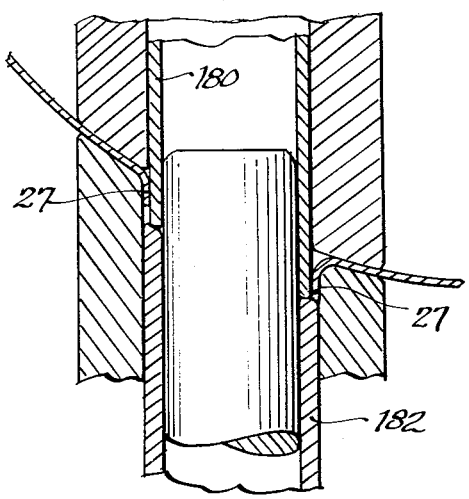
Figure 25:
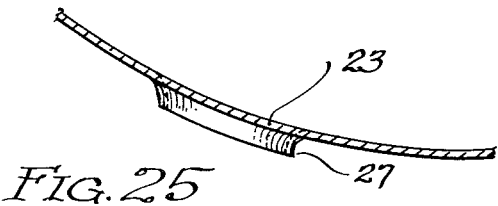

FIGURE 12 discloses the electronic control circuit for the refrigerating mechanism;

FIGURE 13 is a fragment of a top view of the tank before the smoothly rounded sides are formed, and showing a portion of the initial position of the forming head;

FIGURE 14 is a fragment of a top view of the tank after the smoothly rounded sides are formed and showing a portion of the final position of the forming head;

FIGURE 15 is an elevational view of the liquid storage container supported on the dual head forming jig;

FIGURE 16 is a detail of the head forming jig, showing its mode of operation;

FIGURE 17 is an enlarged detail of the head forming jig, showing its pivot control mechanism;

FIGURE 18 is an enlarged side elevation of the tank showing a portion of the inner and outer containers, and the use of a filler strip to help retain the fiber glass insulating material in place;

FIGURE 19 is a sectional view taken along the line 19—19 of FIGURE 18;

FIGURE 20 is a side elevation showing the flange edge smoothing jig supporting the container, and the associated grinding mechanism;

FIGURE 21 is a developed view of the outer tank;

FIGURE 22 is a side elevation of the flange forming jig, for the leg openings in the outer tank;

FIGURE 23 discloses the mode of operation of the flange forming jig, with the outer shell in position on the jig, prior to the formation of the flange;

FIGURE 24 discloses the position of the jig on the outer shell after the flange has been formed;

FIGURE 25 discloses a view of the flanged leg opening in the outer shell after completion of the operation; and FIGURE 26 is a perspective view of a supporting cradle.

Referring now to FIGURE 1, the liquid storage container indicated generally as 10 comprises a tank portion indicated generally as 12, adjustable leg portions indicated generally as 14, a cover portion indicated generally as 16, and a mixing or agitating portion indicated generally as 18. The refrigerating mechanisms such as the motor, condensers, compressors, and fans may be mounted in a housing 20 detachably secured to a Z frame, not shown, on the end of the container.

Figure 4:
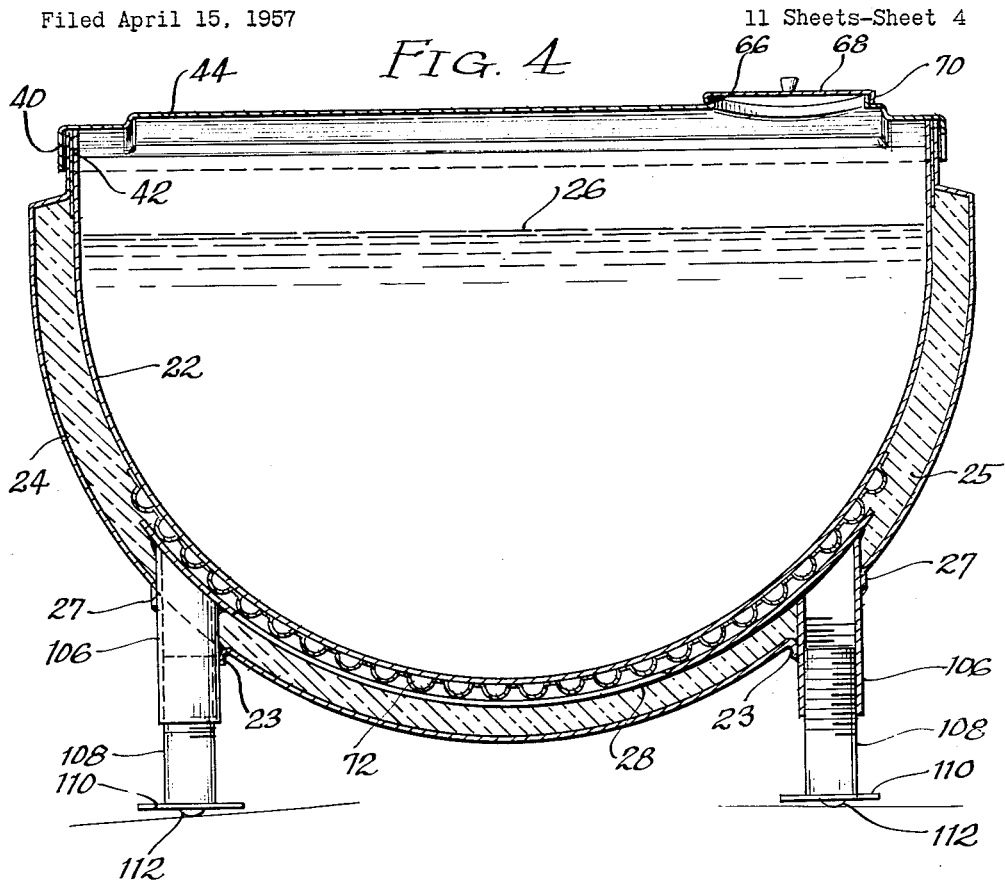
FIGURE 4 is a sectional view taken along the line 4—4 of FIGURE 2.

The tank portion 12, as clearly shown in FIGURES 3 and 4, is substantially semicircular in cross section and consists of an inner shell 22 and a spaced outer shell 24 with a fiber glass insulation 25 fixed between them. As seen, the inner shell has to bear the weight of the liquid 26 which in the example shown is milk, and consequently must be made stronger than the outer shell. In particular, the inner shell is made from 14-gauge metal plate, and the outer shell is made from 16-gauge metal. The inner shell 22, as shown in FIGURE 2, rests on a cradle 28. As seen in FIGURE 26, this cradle has arcuate supporting side and end members designed to conform to the shape of the inner shell. The adjustable leg portions 14 are secured to the cradle, and as seen in FIGURE 4, they extend through openings 23 in the outer shell 24 and rest on the floor. This arrangement helps prevent serious distortions in the inner shell due to the weight of the liquid.

As further seen in FIGURE 2, the bottom 30 of the inner shell slopes downwardly toward the drain valve 32 at one end of the container. This is important because it insures complete drainage when the contents of the container are being transferred, or when the container is being washed. The drain valve 32 is mounted in a recessed portion 34 of the outer shell 24. This reduces the space 36 between the inner shell 22 and the drain valve 32 and lessens the likelihood of milk spoiling in that unrefrigerated space. The inner surface of the inner shell 22 is polished, and, as seen in FIGURES 4 and 19, all of its corners are gently rounded. This eliminates traces of milk which might adhere to the surface of the inner shell or stick in sharp corners during cleaning.

The cover portion indicated generally as 16 comprises spaced rectangular cleaning covers 38 closing off cleaning apertures 39 in the top of the container. The covers 38 slope downwardly to prevent moisture or other foreign material from settling on the surface of the cover and possibly seeping inside of the container, see FIGURE 2. Downwardly depending flanges 40 on the periphery of these covers are in spring frictional engagement with the upwardly extending flanges 42 defining the edges of the cleaning apertures 39. The covers are dished at 44 to give them added rigidity. A handle 46 is fixed at one side of the cover and a hinged portion indicated generally as 48 connects the cover 38 to the top bridge 50 of the container, see FIGURE 1.

The hinge portion 48 comprises spaced pivot plates 52 rigidly secured to one edge of each cover 38, see FIGURE 1. These pivot plates have an edge 54, see FIGURE 3a, projecting downwardly to the surface of the bridge 50 at an angle, which happens to be 45° in the example shown. Edge 54 of the pivot plate intersects another edge 56 at a right angle, and a pivot pin or rivet 58 is rigidly secured to the pivot plate at the apex of the angle. Another pivot pin or rivet 60 is rigidly secured to edge 56 of the pivot plate in spaced relation to pivot pin 58. Upstanding pivot bearing plates 62 are rigidly secured to the top of the bridge 50, one for each pivot plate. The bearing plates 62 are channel shaped in cross section, with inwardly projecting flanges 64 at the top edge. As seen in FIGURES 3a and 3b, when cover 38 is in closed position, pivot pin 58 engages one corner of the channel in bearing plate 62. When the cover is raised, pivot pin 58 is rotated on its axis and pivot pin 60 moves into engagement with the bearing plate. To rest the cover in raised position, the entire cover is just forced back until pivot pin 60 engages the opposite corner of the channel in bearing plate 62, while the pivot pin 58 is still confined within the slot provided by the flange 64ª of greater length than the flange 64, as shown in dotted lines in FIGURE 3a. To remove the cover from the hinge entirely it is only necessary to force the cover back so pivot pin 58 clears the inwardly projecting flange 64, and then lift it out. The important advantage of this hinge structure is that all elements are completely accessible for cleaning purposes. There is no chance for dirt or other impurities to catch in the mechanism. The spaced relation between the pins 58 and 60 is greater than the distance between the base of the slot defined by the flange 64 to the end of the opposite flange 64ª but less than the distance between the base of the slot defined by the flange 64ª and the end of the opposite flange 64.

As seen in FIGURES 2 and 4, a milk receiving aperture defined by upwardly extending flanges 66 is formed in each cleaning cover 38. Each milk receiving aperture is adapted to be closed by a milk cover 68 which has downwardly extending spring flanges 70 in frictional engagement with flanges 66, see FIGURE 4. In use, the milk cover 68 is removed and milk is poured into the container from a hose connected to a milking machine or from a smaller can. A dip stick 57, shown in FIGURE 3, is frictionally inserted in an opening in the top of the container. This is for accurately measuring the volume of milk in the container.

An evaporator plate 72 is secured to the outer surface of the inner shell, see FIGURE 4. As clearly shown in the developed view of FIGURE 5, the evaporator plate has serpentine open channels 74 formed in it. To increase the cooling effect by the refrigerant which must flow through these channels there are two separate cooling circuits in parallel relationship, one in each half of the evaporator plate. The advantage of this arrangement is that when the refrigerant, in this case Freon, enters both channels in a liquid state, it expands and cools both halves of the evaporator plate equally. Without this arrangement and with the liquid refrigerant entering at one end of a much longer serpentine channel, the entrance regions of the serpentine channels would be very cold but by the time the refrigerant reached the end of the serpentine channel, the cooling effect would be negligible. This would result in non-uniform cooling in the container resulting in a loss of efficiency. It is evident that this process could be continued by using greater numbers of cooling circuits in parallel relationship for added cooling uniformity.

Figure 6:
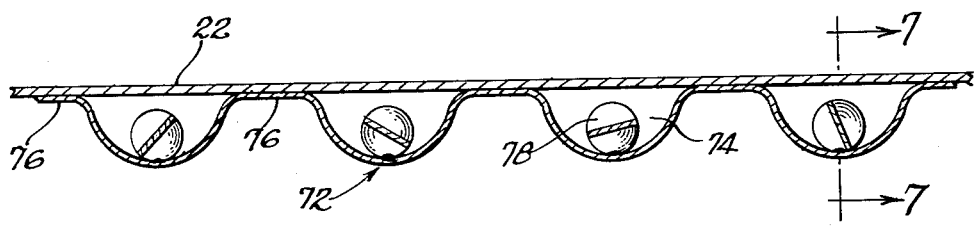
FIGURE 6 is a sectional view taken along the line 6—6 of FIGURE 5.

An important concept of this invention resides in the construction of the evaporator section with the shell wall forming an integral wall of the evaporator thereby to achieve more efficient and complete heat transfer for the extraction of heat from the contained liquid in surface contact directly with the opposite wall of the evaporator member. For this purpose and in order to achieve the desired sealing relation between the separated channels, it has been found best to joint the plate 72, having the channels 74 preformed therein, to the shell while both are in their original flattened state. As seen in FIGURE 6, the evaporator plate 72 is welded to the inner shell at the shell engaging portion 76 closing off the serpentine channels between them. Thereafter the joined elements are shaped to the desired curvature of the shell. The welding must be done carefully to prevent the refrigerant from passing across the adjacent channels instead of through them.

Since the evaporator plate is not the same size as the inner shell, difficulty arose in rolling them simultaneously into the desired shape. These previous difficulties have been eliminated by a new technique. This involves adding filler material to the evaporator plate so that the combined inner shell plate and evaporator plate has a uniform thickness throughout. Then they can be fed into a milling and rolling machine as sheet material and bent into the desired shape. After this is done the filler material can be removed.

Figure 7:
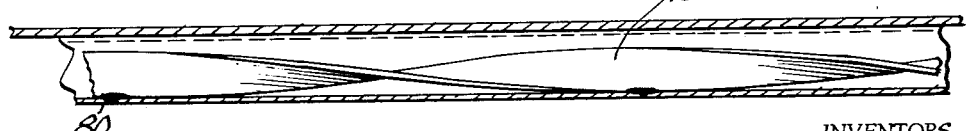
FIGURE 7 is a sectional view taken along the line 7—7 of FIGURE 6.
Figure 8:
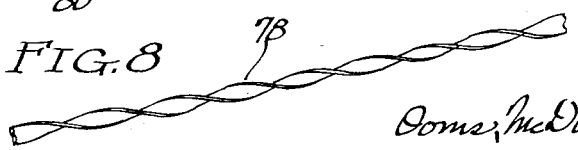
FIGURE 8 is a perspective view of the refrigerant circulating and stiffening member.

It has been found that if the refrigerant is made to flow with turbulence through the serpentine channels, a measurable increase in cooling efficiency will result by comparison with laminar flow of the refrigerant. To produce this turbulence in flow a spiral strip 78 is inserted in one and preferably all of the channels, see FIGURES 6, 7 and 8. These strips are spot welded at 80 to the evaporator plate before the serpentine channels are welded to the inner shell. This arrangement has another beneficial effect in that it further strengthens the inner shell and makes it more resistant to weight deformation.

The agitating portion 18 comprises an agitating or mixing motor 82 mounted on a support 84 secured to the bridge 50, see FIGURE 2. The shaft 86 of the motor is removably connected to the shaft 88 of a stirrer or agitator paddle 90, see FIGURE 3. The removable connection, as clearly seen in FIGURES 9 and 10, comprises a projection 92 and recess 94 on shaft 86, and a complementary projection 96 and recess 98 on shaft 88. The projections and recesses are held in interlocking engagement by means of a cylindrical bushing 100, see FIGURE 9, which telescopes about the shafts and is mounted for shifting movement between locking position while at rest on stop 100ª and raised position wherein the lower end of the cylinder clears the interconnecting means. An additional rubber sleeve 102 embraces shaft 88 above bridge 50 and covers the shaft receiving hole 104 in the bridge. This prevents dirt or contaminated material from entering the container through the shaft receiving hole. To remove the paddle or agitator 90 for cleaning, it is only necessary to raise bushing 100 to the position shown in FIGURE 10 and then bend shaft 88 as shown to disengage it from shaft 86. Then the paddle and shaft can be withdrawn from the container through the large cleaning apertures 39.

As shown in Figure 4, the leg portions 14 comprise threaded tubular depending portions 106 integrally connected to the cradle 28. Extensible legs 108 are in threaded engagement with these tubular depending portions. Integrally secured to the lower ends of the extensible legs 108 are floor engaging plates 110 in the form of flat plates of larger dimension having centrally positioned raised dimples 112. The purpose of the dimples is to provide pivot points to permit the extensible legs 108 to be rotated to level the cradle during installation. Without them, the edges of the floor engaging plates 110, necessary for proper stability of the assembly, would contact the floor making further adjustment of the leg portions very difficult. Ultimately the dimples enter the support to bring the plates into engagement with the surface.

Figure 11:
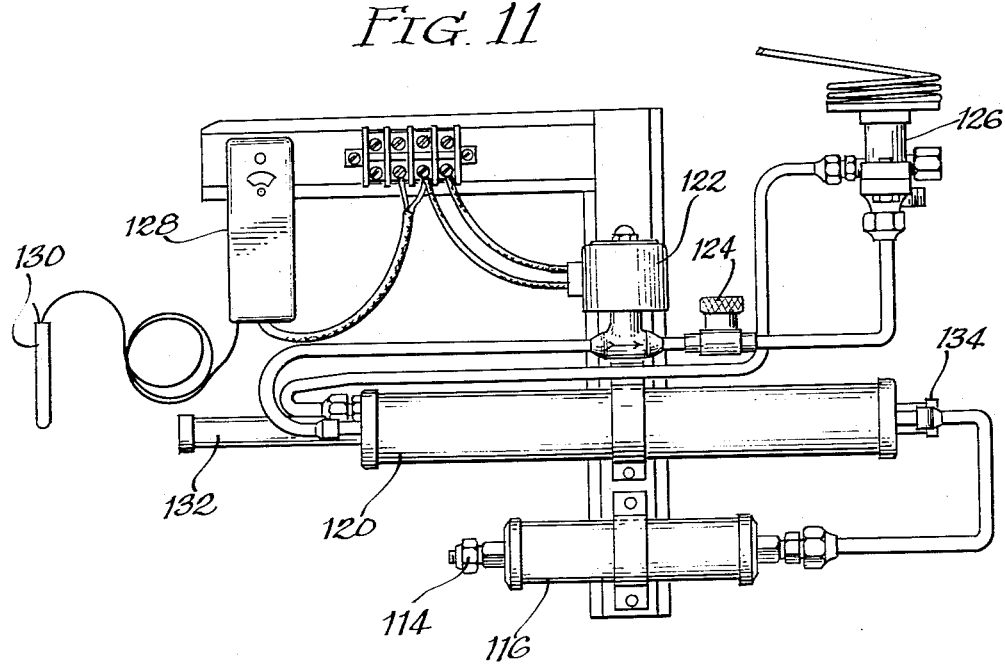
FIGURE 11 is a view of the refrigerating mechanism mounted on one end of the liquid storage tank.

A portion of the refrigerating apparatus is mounted on an end of the container, as seen in FIGURE 11. The Freon is pumped in from the compressor through the inlet coupling 114 and passes through the dryer 116. After the gas is dried, it passes through the heat exchanger 120 and from there it goes through the solenoid valve 122 and sight glass 124 to the thermoswitch controlled expansion valve 126. This expansion valve increases the amount of refrigerant entering the evaporator plates as the temperature inside the container rises. The compressor motor is controlled by a thermoswitch 128 with its temperature sensing element 130 adapted to be positioned inside the container. The expanded refrigerant leaves the evaporator plate in the container and enters the heat exchanger 120 through pipe 132. Upon leaving the heat exchanger the refrigerant goes back to the compressor through pipe 134.

The electrical control circuit for the refrigerating mechanism is shown in FIGURE 12. As seen, the power source, 220 volts A.C., is applied through power lines 136 and 138. The solenoid switches 140 and 150 are normally open. Low pressure switch 142 which is designed to be closed when the pressure in the refrigerating lines rises is also normally open. The on-off switch 146 and timer switch 152 are also normally open. The agitator switch 148 is normally set to terminal 154 for automatic operation of the agitator motor 82. Terminal 156 of the agitator switch is for manual operation as described below. The thermoswitch is normally closed and is designed to open when the temperature in the container drops to a predetermined level.

In operation, closing switch 146 permits current to flow through the thermoswitch 128 and through the solenoid valve 122, agitator motor 82 and through the relay coils of relays 140 and 150. When relay 140 closes, the compressor motor 144 starts, and starts pumping refrigerant through the evaporator plate 72. When the temperature in the container drops to a predetermined level, thermoswitch 128 opens shutting off the agitator motor 82 and the solenoid valve 122, cutting off the supply of refrigerant to the evaporator plate. It is noted, however, that the compressor motor continues to operate for a time after the thermoswitch opens. This is because the low pressure switch 142 remains closed until the compressor 144 substantially evacuates the cooling lines in the evaporator plate 72, then as the pressure drops, switch 142 opens cutting off the compressor. This is important because it permits the interior of the container to be washed with hot cleaning fluid. Unless the refrigerant in the coils is automatically evacuated after shut down, the rise in temperature caused by the hot cleaning fluid could cause dangerously high pressures in the lines.

The agitator switch 148 has a manual position 156 for turning on the agitator motor regardless of the operation or temperature of the refrigerating system. This is for maintaining a homogeneous distribution of the milk whenever samples of the milk are taken for determining its butterfat content. The timer switch 152 provides an added control. When additional warm milk is added to milk already at its desired temperature in the container, the resulting increase in temperature may not be sufficient to actuate the thermoswitch and start the refrigerating mechanism, and since bacteria thrive in mixtures of warm and cold milk, the milk could spoil. It is evident then, from an inspection of FIGURE 12, that the timer switch bypasses the thermoswitch 128 and can be used to turn on the compressor for at least one-half hour prior to the addition of warm milk to the milk in the container thereby to precool the milk in the container to a lower temperature calculated to provide a safe temperature when the warm milk is subsequently added.

An additional pressure controlled switch 158 connected to the compressor through pipe 159 controls the condenser fans 160 and 162. This is important because when the temperature is low, the thermoswitch 128 may open very shortly after the refrigerating cycle has begun and if the fans blowing on the condenser coils have prevented any pressure from building up in the lines, pressure switch 142 will remain open, and so the compressor will not evacuate the refrigerant from the lines. Then if later the container is washed with hot cleaning solutions, the rise in pressure in the cooling coils could damage the apparatus. In effect, as seen in FIGURE 12, the pressure switch 158 cuts off power to fans 160 and 162 until pressure has built up in the lines.

As stated above, the successful production of this liquid storage container involved the inseparable solutions of the specialized problems in design and production. In particular, it is essential that the container used in this environment have no sharp corners in which traces of milk can hide during cleaning. To produce corners with the desired gentle curve, the container is initially formed with square corners, see FIGURE 13. The ends of the container are tack welded to the sides. Then forming heads 164 are forced against both ends of the container bending the material of the container into the desired curve, see FIGURE 14. The forming heads 164 are hydraulically actuated in the particular example shown and are mounted on a support 166, see FIGURE 15. As shown in FIGURE 16, the expansion of the piston in cylinder 168 expands the forming heads against the sides of the shell 22. These forming heads have an added function. After the sides of the inner shell are shaped, and while the forming heads are tightly gripping the container, the sides of the container are smoothly welded to the ends. This arrangement eliminates the possibility of heat distortion during welding providing a rigid volume control for the completed containers. To further assist the welding operation, the forming heads 164 and inner shell 22 can be pivoted on support 166 by means of the hydraulically operated gear and pinion arrangement 167 disclosed in FIGURE 17. This expedites welding because it permits the container to be adjusted to a position best suited to the welder. An additional feature is that all tanks are of the same size, since the expansion of the forming heads is the same for all containers. This is important since the tanks must satisfy rigid statutory requirements relative to their volumes.

The upstanding flange 42 disclosed in FIGURES 2 and 18 pose a special problem. The portion of the flange adjacent the bridge 50 and denoted as 43 is thicker than the portions denoted as 42 because the bridge is made of heavier metal to support the weight of the agitator motor 82. To prevent the weaker portions of the flange from buckling with use and making an imperfect seal with cover 38, a filler 45 has been inserted between inner and outer shells. This filler has the added function of holding sheets of the fiber glass insulation 25 in position during construction. To make certain that the flange 42 makes a good seal with cover 38, it is essential that the top edge 47, composed as it is of three layers of material, be absolutely flat, see FIGURE 18. To achieve this in an economical and efficient manner, means are provided for the use of a welder and grinder operating at a predetermined level and the tank is positioned at an angle to be processed by such automatically operating means. The entire container is mounted on an adjustable support 168. This support holds the container in a tilted position so the top edge 47 of the flange 42 is absolutely level and in alignment with the welding and grinding elements. First the top edge is welded to seal the space between the shells and then the grinder 170 with the extensible grinding arm 172 can grind the top edge 47 of the welded flange absolutely level.

It is also important to prevent dirt, or moisture or contaminating material from getting between the inner and outer shells. One possible place where this can happen is where the feet portions 106 extend through openings 23 in the outer shell, see FIGURE 4. As seen in FIG. 4, openings 23 are closed off by providing flanges 27 around the periphery of holes 23 and then welding these flanges to the periphery of leg member 106. These flanges are formed by means of a jig 174. After the shell 24 shown in developed form in FIGURE 21 has been milled and rolled to its desired cross sectional shape, it is inserted in the jig, as seen in FIGURE 22. Indexing pins 176 extend through apertures 23 and fix the position of the shell, see FIGURE 23. Then the hydraulic press 178 is forced over the indexing pin and the forming sleeve 180 in the press 178 forces the supporting sleeve 182 down, in the manner shown in FIGURE 24, forming the flanges as shown in FIGURE 25. This method of forming flanges in apertures for sealing off the opening 23 in the outer shell 24 have proven to be quicker, and more simple than the previous methods heretofore used.

Having shown and described the invention, what is claimed as new is:

1. A liquid storage container for holding perishable liquids under sanitary conditions comprising inner and outer shells, support means for the container, said support means engaging only said inner shell, an evaporator plate integrally secured to the outer surface of the inner shell for cooling the contents of the container and for strengthening the inner shell against load deformations, the inner surface of the inner shell of the container having smooth surfaces and corners provided thereto, refrigerating means connected to said evaporator plate for pumping refrigerant through it, a thermoswitch for controlling said refrigerating means, means connected to the refrigerating means for over-riding said thermoswitch when additional warm perishable liquids are added to the storage container, and pressure controlled means in said refrigerating mechanism for removing all refrigerant from the evaporator plate each time the thermoswitch acts to turn off the refrigerating mechanism.

2. An apparatus of the class described comprising a milk storage tank, agitating means within said tank, refrigerating mechanism connected to said tank for cooling it, a thermoswitch connected to said agitating means and said refrigerating mechanism for controlling them, means connected to said agitating means for bypassing the thermoswitch control to enable operation of said agitating means independent of temperature control, and means connected to said refrigerating mechanism for bypassing the thermoswitch control for a predetermined length of time for operation of said refrigerating mechanism independent of the agitating means and temperature control and, at the end of said predetermined length of time, return control to said thermoswitch.

3. An apparatus of the class described comprising a refrigerating mechanism, pump means within said refrigerating mechanism for pumping the refrigerant to the cooling coils thereof, valve means connected to said refrigerating mechanism for controlling the flow of refrigerant into the cooling coils thereof, a thermoswitch connected to said valve means and said pumping means for providing a first and a second signal thereto, said first signal actuating said pumping means to initiate refrigerant flow and operating said valve means to permit flow into the cooling coils, said second signal operating the pumping means to terminate refrigerant flow and operating said valve means to cut off the flow of refrigerant into the cooling coils, and delay means connected between said thermoswitch and said pump means for delaying the operation of the pumping means in response to said second signal to permit said pump means to evacuate the cooling coils.

References Cited in the file of this patent

UNITED STATES PATENTS

| | | |
|---|---|---|
| 1,540,572 | Schroder | June 2, 1925 |
| 1,770,533 | Shields | July 15, 1930 |
| 1,779,284 | Muffly | Oct. 21, 1930 |
| 1,803,825 | Abernathy | May 5, 1931 |
| 1,913,433 | Doble | Jan. 13, 1933 |
| 2,013,516 | Heitman | Sept. 3, 1935 |
| 2,334,513 | Shaw | Nov. 16, 1943 |
| 2,400,329 | Alexander | May 14, 1946 |
| 2,551,163 | Rickert et al. | May 1, 1951 |
| 2,553,879 | Stewart | May 22, 1951 |
| 2,740,269 | Buehler | Apr. 3, 1956 |
| 2,741,096 | Fitzner | Apr. 11, 1956 |
| 2,750,755 | Alexander | June 19, 1956 |
| 2,882,695 | Zwickl | Apr. 21, 1959 |